(12) United States Patent
Brodsky et al.

(10) Patent No.: US 6,898,782 B1
(45) Date of Patent: *May 24, 2005

(54) REFERENCE-BASED ASSOCIATIONS USING REFERENCE ATTRIBUTES IN AN OBJECT MODELING SYSTEM

(75) Inventors: Stephen Andrew Brodsky, Los Gatos, CA (US); Gary C. Doney, Sunnyvale, CA (US); Dipayan Gangopadhyay, Cupertino, CA (US); Alexander Gennadievich Glebov, San Jose, CA (US); Michael Morris Golding, Palo Alto, CA (US); Timothy James Grose, Sunnyvale, CA (US); Rebecca Mei-Har Lau, San Jose, CA (US); Subrata Mitra, San Jose, CA (US); Rajendra Bhagwatisingh Panwar, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1280 days.

(21) Appl. No.: 08/951,812

(22) Filed: Oct. 14, 1997

(51) Int. Cl.$^7$ ................................................. G06F 9/44
(52) U.S. Cl. ....................................... 717/104; 717/108
(58) Field of Search ............................ 395/764; 717/1, 717/100–108

(56) References Cited

U.S. PATENT DOCUMENTS

| | | |
|---|---|---|
| 4,845,665 A | 7/1989 | Heath et al. |
| 5,247,651 A | 9/1993 | Clarisse |
| 5,257,363 A | 10/1993 | Shapiro et al. |
| 5,303,379 A | 4/1994 | Khoyi et al. |
| 5,315,703 A | 5/1994 | Matheny et al. |
| 5,315,709 A | 5/1994 | Alston, Jr. et al. |
| 5,325,533 A | 6/1994 | McInerney et al. |
| 5,341,478 A | 8/1994 | Travis, Jr. et al. |
| 5,390,320 A | 2/1995 | Smithline |
| 5,390,330 A | 2/1995 | Talati |
| 5,421,015 A | 5/1995 | Khoyi et al. |
| 5,437,025 A | 7/1995 | Bale et al. |
| 5,437,037 A | 7/1995 | Furuichi |
| 5,493,682 A | 2/1996 | Tyra et al. |
| 5,515,497 A | 5/1996 | Itri et al. |
| 5,528,503 A | 6/1996 | Moore et al. |
| 5,537,630 A | 7/1996 | Berry et al. |
| 5,542,040 A | 7/1996 | Chang et al. |
| 5,555,365 A | 9/1996 | Selby et al. |
| 5,557,518 A | 9/1996 | Rosen |
| 5,889,992 A * | 3/1999 | Koerber ................... 395/702 |
| 6,038,393 A * | 3/2000 | Iyengar et al. ............. 717/1 |

OTHER PUBLICATIONS

James Rumbaugh et al, Object–Oriented Modeling and Design Chapters 15 & 16, 1991.*

(Continued)

Primary Examiner—Kakali Chaki
(74) Attorney, Agent, or Firm—Gates & Cooper LLP (57) ABSTRACT

A method, apparatus, and article of manufacture for modeling an object-oriented system. Within the object model, a reference attribute is specified for a class and a first object is instantiated from the class. Thereafter, a reference-based association can be added to the first object using the reference attribute, wherein the reference-based association identifies a relationship between the first object and a second object.

30 Claims, 6 Drawing Sheets

OTHER PUBLICATIONS

Principles of Object–Oriented Analysis and Design, James Martin, Chapters 1–22, Appendix A, Jun. 1992.*
Object–Oriented Analysis and Design with Applications, Grady Booch, Chapters 1–9, Sep. 1993.*
Visual Object–Oriented Programming Concepts and Environments, M. Burnett et al. Chapters 1–12, 1994.*
Visual Object–Oriented Programming Concepts and Environmented M. Burnett pp. 3–20, 1995.*
The Design and Evolution of C++, Bjarne Stroustrup, Addiso–Wesley Publishing Company, Mar. 1994.*
Object–Oriented Modleing and Design, Rumbaugh et al. Chapters 15 and 16, Mar. 1994.*
Rational Rose C++ Version 4.0 Documentation set Rat–UR, Rat–C++, Rat–EG, Rat–QR, Nov. 1996.*
Grady Booch Object Oriented Analysis and Design pp. 91–133, 1994.*
James Rumbaugh et al "Object Oriented Modeling and Design" pp. 1–10, Nov. 1990.*
Ivar Jacobsen "Object Oriented Software Engineering" pp. 1–20, Jan. 1996.*
Citrin, Wayne, et al., "Using Formalized Temporal Message– flow Diagrams," *Software–Practice and Expericene*, vol. 25, No. 12, pp. 1367–1401, Dec. 1995.
Coats, Mark, et al., "Constructing Operational Specifications," *Dr. Dobb's Journal of Software Tools for Professional Programmer*, vol. 20, No. 6, pp. 18–33, Jun. 1995.
De Man, Jozef, et al., "Towards a formal Semantics of Message Sequence Charts", *SDL '93 Using Objects. Proceedings of the Sixth SDL Forum 1993*, pp. 157–165, 1993.
De Man, Jozef, et al., "Developing Formal Specifications with Message Sequence Charts", *XIV International Switching Symposium*, vol. 2, pp. 134–137, Oct. 1992.
Ek, Anders, "Verifying Message Sequence Charts with the SDT Validator", *SDL '93. Using Objects. Proceedings of the Sixth SDL Forum 1993*, pp. 237–249, 1993.
Gangopadhyay, Dipayan, et al., Research Report, "Obj-Chart–Builder: An Environment for Executing Visual Object Models", IBM Research Division, pp. 1–16, Apr. 29, 1993.
Gangopadhyay, Dipayan, et al., "ObjChart: Tangible Specification of Reactive Object Behavior", *7th European Conference Proceedings*, pp. 432–457, Jul. 26–30, 1993.
Grabowski, Jens, et al., "The Standardization of Message Sequence Charts", *Proceedings 1993: Software Engineering Standards Symposium*, pp. 48–63, 1993.
Graubmann, Peter, et al., "Towards a Petri Net Based Semantics Definition for Message Sequence Charts", *SDL 93: Using Objects. Proceedings of the Sixth SDL Forum 1993*, pp. 179–190, 1993.
Hadzilacos, Thanasis, et al., "Transaction Synchronisation in Object Bases", *Journal of Computer and System Sciences*, vol. 43, pp. 2–24, 1991.
Ito, Atsushi, et al., "Transformation Technique Between Specification in SDL and Specification in Message Sequence Charts for Designing Protocol Specifications", *Supercomm/ICC '92: Discovering a New World of Communications*, IEEE, vol. 1, pp. 0442–0447, 1992.
Ladkin, Peter B., et al., "What do Message Sequence Charts Mean?", *IFIP Trans. C. Commun. Syst.*, vol. C, No. 22, pp. 301–316, 1994.
Ladkin, Peter B., et al., "Interpreting Message Flow Graphs", *Formal Aspects of Computing 1995*, vol. 7, No. 5, pp. 473–509, 1995.
Mauw, S., et al., "An Algebraic Semantics of Basic Message Sequence Charts", *The Computer Journal*, vol. 37, No. 4, pp. 269–277, 1994.
Mauw, S. et al., "A Formal Semantics of Synchronous Interworkings", *SDL '93 Using Objects: Proceedings of the Sixth SDL Forum 1993*, pp. 167–178, 1993.
Misra, Jayadev, "Equational Reasoning About Nondeterministic Processes", *Formal Aspects of Computing*, vol. 2, No. 2, pp. 167–195, Apr.–Jun. 1990.
Moriyasu, Kenji, et al., "A Method of Applying Message Sequence Chart Specifications for Services with Variant Process Structure", *Electronics and Communications in Japan*, Part 1, vol. 78, No. 9, pp. 12–24, 1995.
Okamoto, Mitsuhiro, et al., "A Verification Scheme for Service Specifications Described by Information Sequence Charts", *IEICE Trans. Commun.*, vol. E75–B, No. 10, pp. 978–985, Oct. 1992.
Thrampoulidis, K.X., et al., "Object Interaction Diagram: A New Technique in Object–oriented Analysis and Design", *Journal of Object–Oriented Programming*, vol. 8, No. 3, pp. 25–32, Jun. 1995.
Tyra, K. L., et al., Printout of Search of Data Base: USPA, Search 1: Attribute$ and (Object or Objects) and (Batch 1), Printed Wednesday, Oct. 30, 1996 13:24, REFATTRI INFOGAT2 A1, pp. 1–8.

* cited by examiner

REFERENCE-BASED ASSOCIATIONS USING REFERENCE ATTRIBUTES IN AN OBJECT MODELING SYSTEM

CROSS-REFERENCE TO RELATED APPLICATIONS

This application is related to the following co-pending and commonly-assigned patent applications:

Application Ser. No. 08/747,415, entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996, by Stephen A. Brodsky et al. now U.S. Pat. No. 5,893,913, issued Apr. 13, 1999;

Application Ser. No. 08/747,414, entitled "LAYOUT METHOD FOR ARC-DOMINATED LABELLED GRAPHS," filed on Nov. 12, 1996, by Dipayan Gangopadhyay et al., now U.S. Pat. No. 6,011,559, issued Jan. 4, 2000;

Application Ser. No. 08/747,416, entitled "MULTI-OBJECT VIEWS IN AN OBJECT MODELING TOOL," filed on Nov. 12, 1996, by Roni Korenshtein, now U.S. Pat. No. 5,917,498, issued Jun. 29, 1999;

Application Ser. No. 08/747,057, entitled "INTERACTIVE MODELING AGENT FOR AN OBJECT-ORIENTED SYSTEM," filed on Nov. 12, 1996, by Stephen A. Brodsky et al., now U.S. Pat. No. 5,907,706, issued May 25, 1999;

Application Ser. No. 08/747,058, entitled "EXECUTION ENGINE IN AN OBJECT MODELING TOOL," filed on Nov. 12, 1996, by Stephen A. Brodsky et al., now U.S. Pat. No. 5,983,016, issued Nov. 9, 1999;

Application Ser. No. 08/747,417, entitled "NOTIFICATION MANAGER FOR OBJECT-ORIENTED SYSTEMS," filed on Nov. 12, 1996, by Stephen A. Brodsky et al., now U.S. Pat. No. 5,991,536, issued Nov. 23, 1998;

Application Ser. No. 08/850,829, entitled "METHOD FOR SYNCHRONIZATION BETWEEN LINKS AND GROUP DEFINITIONS WITHIN AN OBJECT-ORIENTED SYSTEM," filed on May 2, 1997, by Stephen A. Brodsky et al., now U.S. Pat. No. 6,237,142, issued May 22, 2001;

Application Ser. No. 08/850,858, entitled "OBJECT OUTLINE VIEW FOR GROUPS WITHIN AN OBJECT-ORIENTED SYSTEM," filed on May 2, 1997, by Stephen A. Brodsky et al.;

Application Ser. No. 08/850,214, entitled "METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM," filed on May 2, 1997, by Stephen A. Brodsky et al., now U.S. Pat. No. 6,243,763, issued Jun. 5, 2001;

Application Ser. No. 08/850,832, entitled "CHANGE AND ACCOUNTING LOG FOR OBJECT-ORIENTED SYSTEMS," filed on May 2, 1997, by Stephen A. Brodsky et al., now U.S. Pat. No. 5,895,472, issued Apr. 20, 1999;

Application Ser. No. 08/850,838, entitled "MODEL TRACE VIEW FOR OBJECT-ORIENTED SYSTEMS," filed on May 2, 1997, by Stephen A. Brodsky et al., now U.S. Pat. No. 5,960,199, issued Sep. 28, 1999;

Application Ser. No. 08/850,337, entitled "FRACTAL NESTED LAYOUT FOR HIERARCHICAL SYSTEMS," filed on May 2, 1997, by Stephen A. Brodsky, now U.S. Pat. No. 6,122,634, issued Sep. 19, 2000;

Application Ser. No. 08/850,847, entitled "REFERENCE ATTRIBUTES WITHIN AN OBJECT-ORIENTED SYSTEM," filed on May 2, 1997, by Stephen A. Brodsky, now U.S. Pat. No. 6,418,482, issued Jul. 9, 2002; and Application Ser. No. 08/951,811, entitled "MODELING BEHAVIOR OF OBJECTS ASSOCIATED WITH FINITE STATE MACHINES AND EXPRESSING A SEQUENCE WITHOUT INTRODUCING AN INTERMEDIATE STATE WITH THE ARC LANGUAGE," filed on Oct. 14, 1997, by Dipayan Gangopadhyay et al., now U.S. Pat. No. 6,182,024, issued Jan. 30, 2001;

all of which applications are incorporated by reference herein.

BACKGROUND OF THE INVENTION

1. Field of the Invention

This invention relates in general to object-oriented programming systems, and in particular, to a method for relating the execution behavior of object models to their class models using reference-based associations.

2. Description of Related Art

OOAD (Object-Oriented Analysis and Design) is gaining popularity in the marketplace. As a result, a number of different vendors provide Object Modeling Tools that support specific OOAD methods.

The concept of an association is central to almost all OOAD methods. Associations in OOAD notations are simple diagrammatic annotations to capture the intention of the modeler as to possible knowledge of one class from another. However, usually association is used simply as a diagrammatic annotation between classes, and has no significance in the final running application that is being modeled. For example, an association in the diagrammatic notation may translate either as a method invocation of one class instance by an instance of the other, or it may stand for an instance of a class sending an instance of another as an argument to a method call on a third object.

Association in such cases, signifies that the class at one end has a knowledge of (or in some way uses) information provided by the class at the other end, without being specific as to what kind of knowledge this is, and how the knowledge is reflected in the final application being modeled. Therefore, there are several possible interpretations that could be attributed to such annotations.

The present invention alleviates these problems and provides a different type of reference-based association using a notation that provides exact semantic meaning in the context of the application being modeled. This form of association is also directly reflected in the execution behavior of the application being modeled. Furthermore, in this perspective, the present invention maintains consistency between the objects and the classes to provide an exact execution behavior of objects (instances) when their types (classes) have been related using reference-based associations. Furthermore, the present invention provides a way to generate source code from such a construct (in a programming language such as C++/Java, etc.), such that the behavior of the generated code is consistent with the semantic meaning of reference-based associations.

SUMMARY OF THE INVENTION

To overcome the limitations in the prior art described above, and to overcome other limitations that will become apparent upon reading and understanding the present specification, the present invention discloses a method, apparatus, and article of manufacture for modeling an object-oriented system. Within the object model, a reference attribute is specified for a class and a first object is instantiated from the class. Thereafter, a reference-based association can be added to the first object using the reference attribute, wherein the reference-based association identifies a relationship between the first object and a second object.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention presents a new definition for association in the context of OOAD (Object-Oriented Analysis and Design) performed by an Object Modeling Tool. The significance of this new definition is that the reference-based association of the present invention has an exact semantic meaning and is not simply just a diagrammatic annotation. The reference-based association is also directly reflected in the execution behavior of the application being modeled.

A reference-based association is a binary relationship between two participating classes, where names may be specified for the two classes together with the cardinalities of the classes. These names are used to create reference attributes, one for each of the two classes that are related by the association. Furthermore, both these reference attributes are annotated with types (the reference attribute for one class has a type corresponding to the other class). Finally, the specified cardinality values are stored with the corresponding reference attributes.

Associations as used in the prior art could also be binary relationships between classes. However, that is all that could be told from their usage. There was no information available to determine what kind of a relation was being defined that was reflected in the final executable application being generated.

A reference-based association, however, provides useful semantic information for the object model. The reference attributes store information concerning potential connections to instances of the classes. The types dictate what instances can actually be connected together using the reference attribute and the cardinality limits the maximum number of such connected instances.

The present invention also provides a synchronization mechanism for effecting consistent behavior of instances when using reference-based associations at a class-level specification. This occurs by defining a run-time system that maintains consistency between the objects and the classes, where the classes are related using reference-based associations. As a result, there is provided an exact execution behavior of objects (instances) when their types (classes) have been related using reference-based associations.

After a model has been created (and tested, if the tool also has execution capabilities) using reference-based associations, there is a need to generate the source code to create standalone applications. The present invention provides code generation mechanisms for reference-based association. Furthermore, the aim is to generate code such that the behavior of the generated code is consistent with the semantic meaning of reference-based associations.

Hardware Environment

Figure 1:
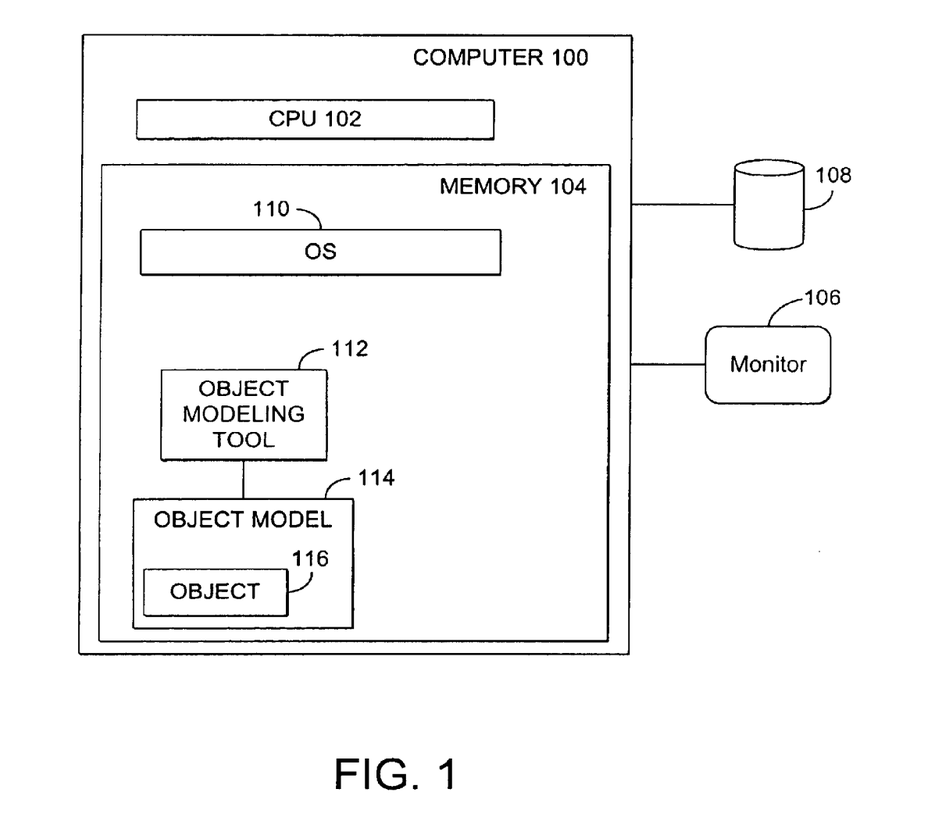
FIG. 1 illustrates an exemplary computer hardware environment compatible with the present invention.

FIG. 1 illustrates an exemplary environment that could be used with the present invention. The present invention is typically implemented using a computer 100, wherein the computer 100 comprises a processor 102, random access memory (RAM) 104, read-only memory (ROM) and/or other components. The computer 100 may be coupled to I/O devices, such as a monitor 106, keyboard (not shown), mouse device (not shown), fixed and/or removable data storage devices 108, printers (not shown), etc. The computer 100 could also include data communications devices (not shown) for coupling to other remote devices via a local area network (LAN), wide area network (WAN), Internet, etc. Of course, those skilled in the art will recognize that any combination of the above components, or any number of different components, peripherals, and other devices, may be used with the computer 100.

Generally, the computer 100 operates under control of an operating system 110. The operating system 110 is booted into the memory 104 of the computer 100 for execution when the computer 100 is powered-on or reset. In turn, the operating system 110 then controls the execution of one or more computer programs 112 by the computer 100. The present invention is preferably implemented in these computer programs 112, which comprise an Object Modeling Tool 112 that accesses an Object Model 114 stored in the memory 104 of the computer 100 and comprised of one or more Objects 116.

Generally, the operating system 110, Object Modeling Tool 112, Object Model 114, and/or Objects 116 are tangibly embodied in and/or readable from a device, carrier, or media, such as a memory, data storage devices 108, and/or remote devices accessible via data communications devices. The operating system 110, Object Modeling Tool 112, Object Model 114, and/or Objects 116 are comprised of instructions and/or data which, when read, interpreted and/or executed by the computer 100, causes the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof.

The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Reference-Based Associations

Reference-based associations are class level constructs provided by the Object Modeling Tool 112 of the present invention. Using reference-based associations, a user models a particular relationship between two or more classes. Once a reference-based association has been used at the class level, the Object Modeling Tool 112 provides an execution environment with consistent semantics for the resulting Object Models 114. Finally, when these Object Models 114 are generated into standalone applications (e.g., in a programming language such as C++ or Java), the Object Modeling Tool 112 generates consistent source code for both the class level (i.e., static) and object level (i.e., dynamic) behavior.

Figure 2:
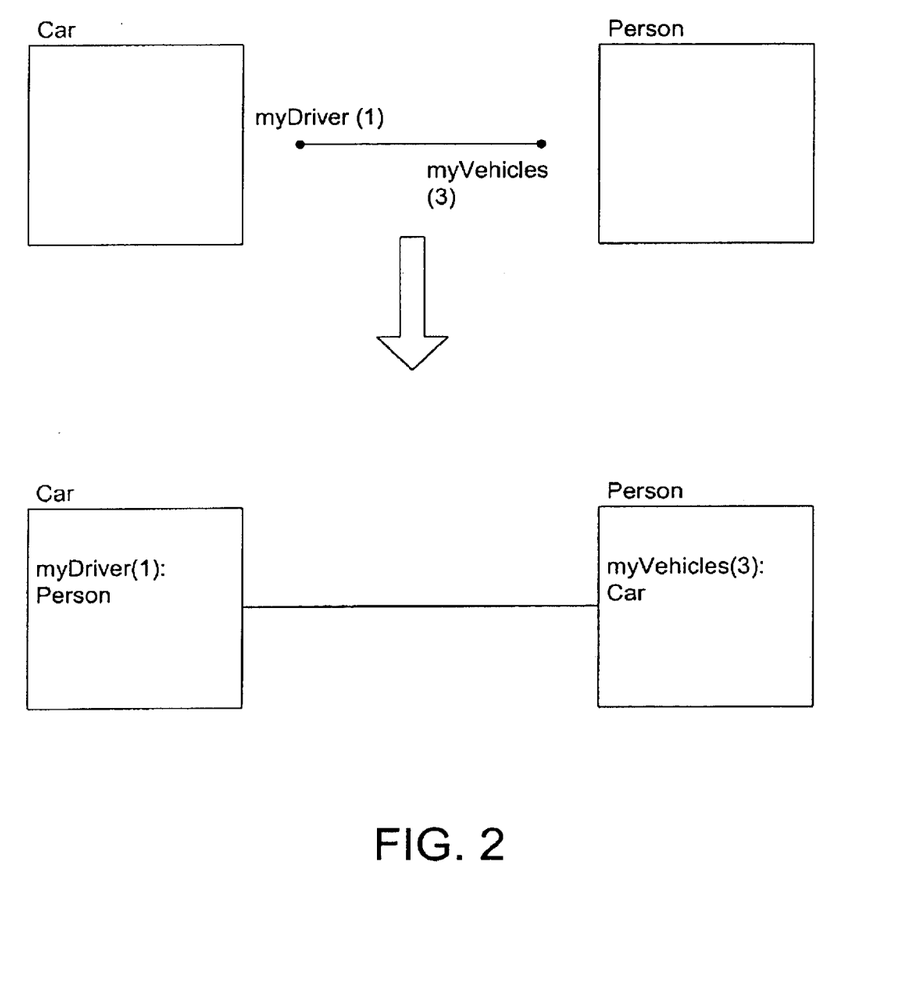
FIG. 2 is a block diagram illustrating a reference-based association according to the present invention.

FIG. 2 is a block diagram illustrating a reference-based association according to the present invention. In this example, the top-part of FIG. 2 provides a situation in which two classes, as represented by the boxes labelled Car and Person, are associated using a reference-based association, as indicated by the line between the boxes. In addition, the ends of the association line have been named, wherein the Car references the associated Person using the name myDriver, and similarly, the Person references all the associated Cars using the name myVehicles. The cardinalities also have been identified, as represented by the numbers in parentheses at each of the ends of the association line.

The intent of the top-part of FIG. 2 is to model a situation in which a Car has a (single) driver associated with it, and the driver has to be a Person, such that the Person can be referred to by the car using the name myDriver. Likewise, each Person may have as many as three Cars associated with them, all of which can be collectively referred to as myVehicles, and each vehicle has to be of type Car (e.g., as opposed to an aeroplane).

The bottom-part of FIG. 2 illustrates the implementation of the reference-based association given in the top-part of FIG. 2. This is done by introducing reference-attributes within each of the two participating classes. A reference attribute in a class simply specifies the potential of an instance of that class to have a reference to other objects. In this example, the bottom-part of FIG. 2 indicates the cardinality as well as the type of object that the attribute could reference.

Figure 3:
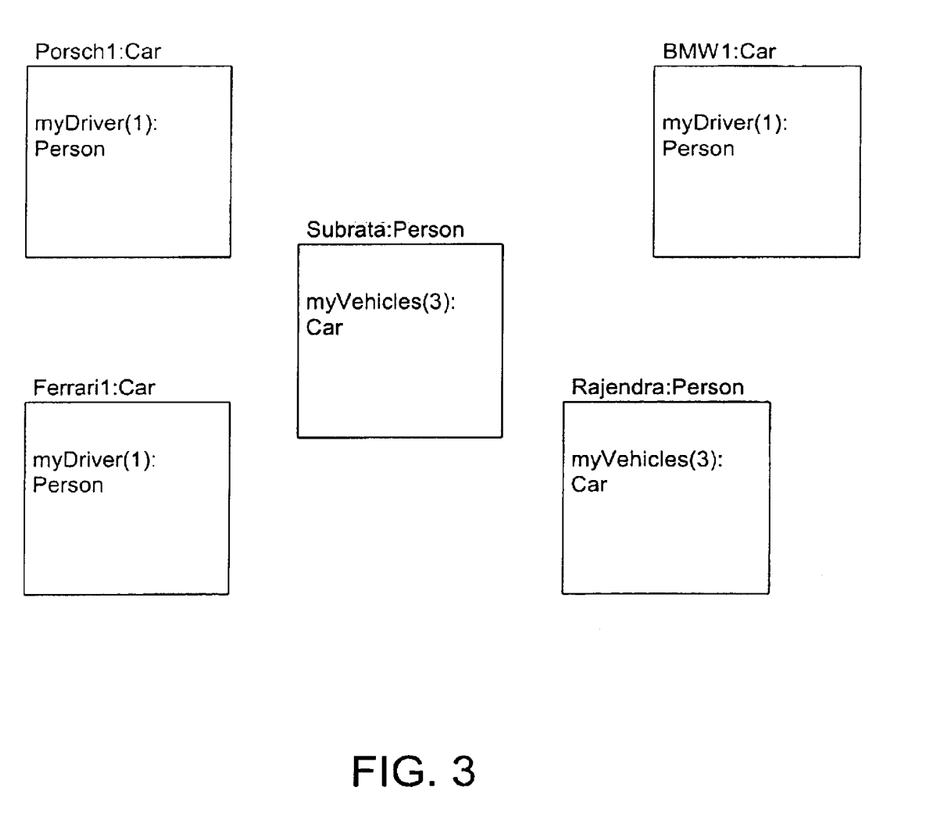
FIG. 3 is a block diagram illustrating the synchronization of reference-based associations according to the present invention.

FIG. 3 is a block diagram illustrating the synchronization of reference-based associations according to the present invention. In this example, a simple model includes three instances of type Car (namely, Porsch1, Ferrari1 and BMW1) and two instances of type Person (Subrata and Rajendra). Furthermore, the following also holds:

Porsch1.myDriver=Subrata

Ferrari1.myDriver=Subrata

Subrata.myVehicles=(Porsch1,Ferrari1)

BMW1.myDriver=Rajendra

Rajendra.myVehicles=(BMW1)

The objects in FIG. 3 are consistent with the class diagram of FIG. 2 that provides the definition of the reference-based association. Moreover, the objects of FIG. 3 have run-time reference-based associations that synchronize with the corresponding class level reference-based associations.

At run-time, the type information of the reference attribute ensures that the given attribute can only reference objects of the prescribed type. For instance, Porsch1.myDriver=Ferrari1 would not be allowed by the Object Modeling Tool 112, since the type of the reference attribute myDriver is Person. This check would follow the normal type-checking conventions of an object-oriented specification, i.e., any slot which needs an object of a required type (e.g., Person) can be filled with one that is an instance of that type, or of a sub-type (e.g., male) thereof. This consistency check is performed by the Object Modeling Tool 112.

Similarly, the Object Modeling Tool 112 has to maintain consistency with the prescribed cardinalities. For instance, in the given example of FIG. 3, Rajendra cannot be added as an additional driver for Porsch1, even though there is no typing violation. The reason is that the classes have specified that the maximum cardinality of myDriver is 1, which implies a second driver cannot be added. Of course, if Subrata was removed from the contents of the reference attribute, Rajendra could thereafter be added without violating the cardinality. Furthermore, the reference attribute would ensure message forwarding as they normally do (i.e., if myDriver is used to send a message in the description of the Car class, then the message would be delivered to the current driver of the car during run-time). See, for example, application Ser. No. 08/850,847, entitled "REFERENCE ATTRIBUTES WITHIN AN OBJECT-ORIENTED SYSTEM," filed on May 2, 1997, by Stephen A. Brodsky, now U.S. Pat. No. 6,418,482, issued Jul. 9, 2002, which application is incorporated by reference herein.

Finally, in order to completely synchronize classes and objects, changes in the cardinality and type of classes must be handled.

Regarding cardinality changes, increments of cardinality are allowed (which includes changing any number to * to indicate any value is allowed). Decrements of cardinality are also allowed (which includes changing a * to any number), only if there is no conflict in any instance (for example, in order to reduce a cardinality of myVehicle from 3 to 2, one has to ensure that no instance of Person currently has more than 2 objects referenced through its myVehicle attribute).

Regarding type changes, these should be treated as deletion and re-creation of the association link. Deletion would mean removal of the reference attributes from the classes (and therefore from all instances), while creation would mean addition of reference attributes to classes and instances (with uninitialized values at the instance level).

User Interface of the Object Modeling Tool

Additional information concerning the user interface elements of the Object Modeling Tool 112 that relate to reference attributes can be found in co-pending and commonly-assigned application Ser. No. 08/850,847, entitled "REFERENCE ATTRIBUTES WITHIN AN OBJECT-ORIENTED SYSTEM," filed on May 2, 1997, by Stephen A. Brodsky, now U.S. Pat. No. 6,418,482, issued Jul. 9, 2002, which application is incorporated by reference herein.

Class Specifications and Implementations

The class specifications and implementations for reference-based association must include, at a minimum, methods for object instantiation, adding a reference attribute, deleting a reference attribute, adding a reference-based association using the reference attribute, and deleting a reference-based association using the reference attribute.

Reference Attributes Implementation

Figure 4:
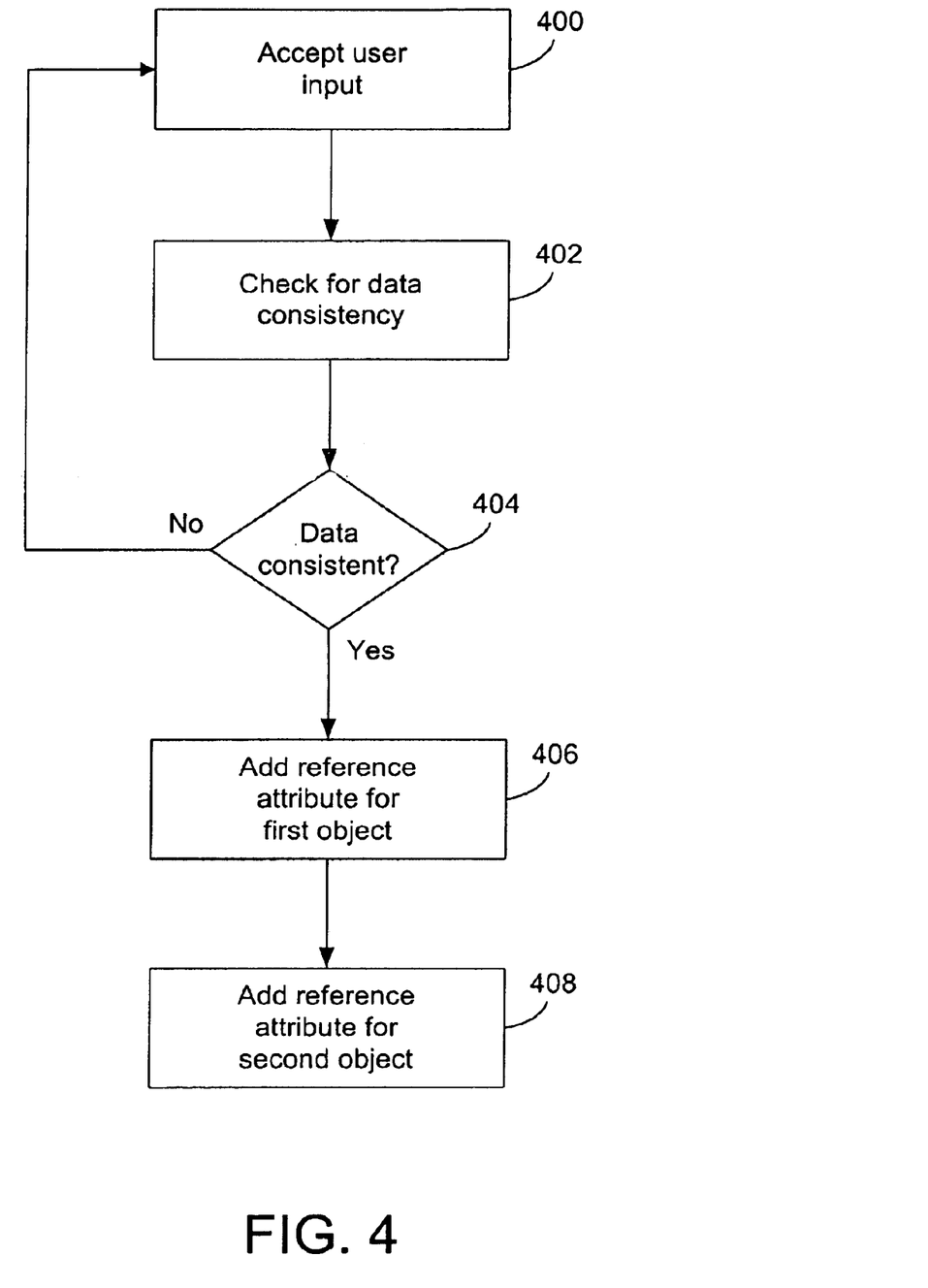
FIG. 4 is a flowchart that illustrates the logic performed by the Object Modeling Tool for implementing reference attributes according to the present invention.

FIG. 4 is a flowchart that illustrates the logic performed by the Object Modeling Tool 112 for implementing reference attributes according to the present invention.

Block 400 represents the Object Modeling Tool 112 accepting input from the user, including the associated classes (e.g., Class1 and Class2), reference names for the association (e.g., RefName1 and RefName2), and corresponding cardinality values (e.g., Card1 and Card2).

Block 402 represents the Object Modeling Tool 112 checking for data consistency. For example, in this step, Class1 should not have a name clashing with RefName1, Class2 should not have a name clashing with RefName2, and Card1 and Card2 should be in 1-* (wherein * is a symbol representing "many").

Block 404 is a decision block that determines whether data consistency exists. If not, control is transferred back to Block 400; otherwise, control transfers to Block 406.

Block 406 represents the Object Modeling Tool 112 adding reference attribute RefName1 to Class1, setting its type to be Class2 and storing Card1 as the cardinality value for the reference attribute.

Block 408 represents the Object Modeling Tool 112 adding reference attribute Refame2 to Class2, setting its type to be Class1 and storing Card2 as the cardinality value for the reference attribute.

Reference-Based Associations Implementation

Figure 5:
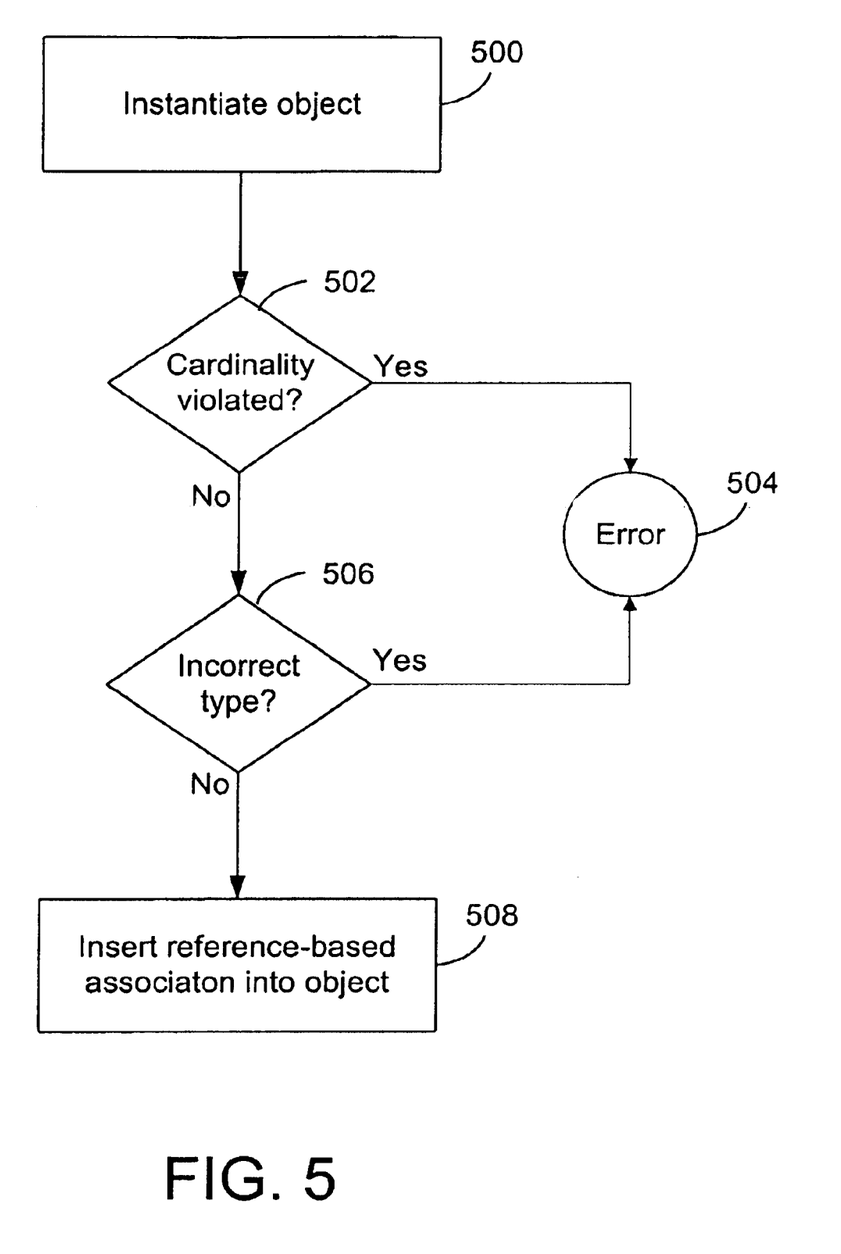
FIG. 5 is a flowchart that illustrates the logic performed by the Object Modeling Tool for implementing reference-based associations according to the present invention.

FIG. 5 is a flowchart that illustrates the logic performed by the Object Modeling Tool 112 for implementing reference-based associations according to the present invention. The implementation is based on the run-time implementation of reference attributes.

Block 500 represents the Object Modeling Tool 112 instantiating an object from a pre-defined class specification.

Blocks 502–508 represent the Object Modeling Tool 112 adding a reference attribute to the object.

Block 502 is a decision block that determines whether the cardinality of the reference attribute is violated by being smaller than the number of reference-based associations. If so, control is transferred to Block 504 to report the error and terminate the logic; otherwise, control is transferred to Block 506.

Block 506 is a decision block that determines whether the object type is incorrect because it is not a subtype of the reference attribute type. If so, control is transferred to Block 504; otherwise, control is transferred to Block 508.

Block 508 represents the Object Modeling Tool 112 performing a normal insertion of the reference-based association into the object and incrementing the number of reference-based associations in the object.

Code Generation Implementation

Figure 6:
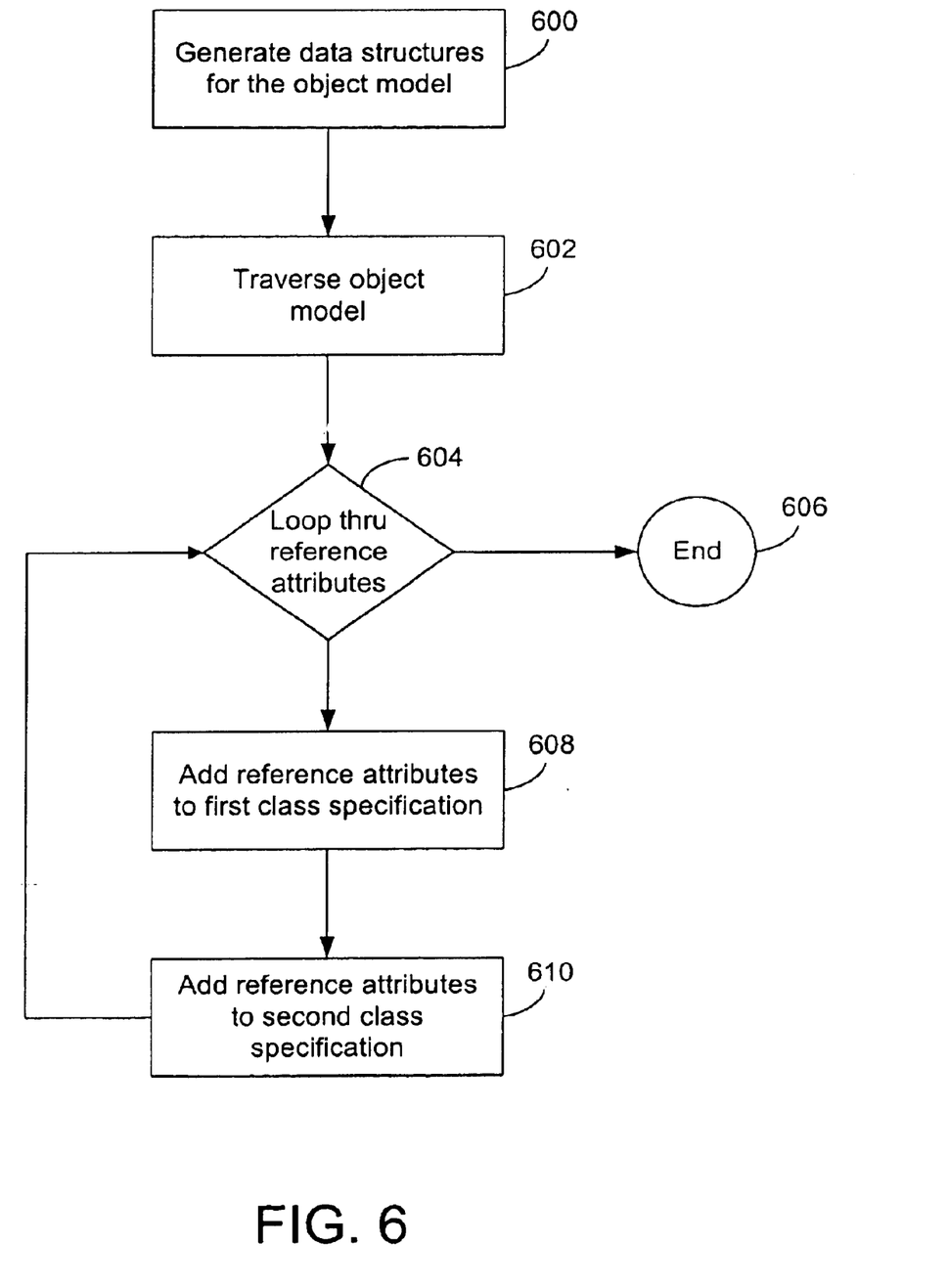
FIG. 6 is a flowchart that illustrates the logic performed by the Object Modeling Tool for generating source code for the class specifications and implementations using reference-based associations according to the present invention.

FIG. 6 is a flowchart that illustrates the logic performed by the Object Modeling Tool 112 for generating source code for the class specifications and implementations using reference-based associations according to the present invention.

Block 600 represents the Object Modeling Tool 112 generating the data structures stored in the memory 104 of the computer 100 to represent the Object Model 114.

Block 602 represents the Object Modeling Tool 112 traversing the data structures that represent the Object Model 114, so as to output the code in a target programming language.

Blocks 604–610 represent the Object Modeling Tool 112 generating the code specific to each reference-based association in the target programming language.

Block 604 is a loop performed by the Object Modeling Tool 112 for each reference attribute "ref12", wherein ref12 connects Class1 and Class2, with cardinality Card1 and Card2, and names RefName1 and RefName2, respectively. Upon completion of the loop, control is transferred to Block 606 to terminate the logic.

Block 608 represents the Object Modeling Tool 112 adding the following to Class1: a list of type class2 called RefName1, a method addReference(Class2 *x) for adding x to the list RefName1, a check for maximum cardinality in addReference, and a method deleteReference( ) for deleting an element from the list RefName1.

Block 610 represents the Object Modeling Tool 112 adding similar elements as Block 608 to Class2.

CONCLUSION

In conclusion, the present invention discloses a method, apparatus, and article of manufacture for modeling an object-oriented system. Within the object model, a reference-based association is specified for a pair of classes and objects are instantiated from the two classes (which are associated). The reference attributes of the reference-based association are used to associate some instances of the first class with instances of the second class (provided the cardinality constraints are not violated).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computerized method for modeling an object-oriented system, comprising:

(a) creating a reference-based association relating first and second classes by specifying a reference attribute in the first class corresponding to the second class, wherein the reference attribute in the first class includes a type and cardinality;

(b) instantiating one or more objects from the first class and one or more objects from the second class; and (c) associating one or more of the objects of the first class to one or more objects of the second class using the reference attribute, wherein the type included in the reference attribute indicates that only objects instantiated from the second class can be connected to the objects instantiated from the first class and the cardinality included in the reference attribute indicates how many objects from the second class can be connected to the objects of the first class, thereby maintaining consistency between the classes and the objects in order to provide an exact execution behavior for the objects instantiated from the classes.

2. The method of claim 1, further comprising generating source code for the objects that is consistent with the reference-based association.

3. The method of claim 1, further comprising specifying a name for the reference attribute.

4. The method of claim 1, wherein the type of the reference attribute corresponds to the second class.

5. The method of claim 1, wherein the cardinality of the reference attribute limits how many objects from the second class can be connected to the objects of the first class.

6. The method of claim 1, further comprising executing a run-time system that maintains consistency between the objects and the classes.

7. The method of claim 1, further comprising synchronizing object reference-based associations with their corresponding class reference-based associations.

8. The method of claim 1, further comprising performing a consistency check at run-time to ensure that the reference attribute only references objects of a prescribed type.

9. The method of claim 1, further comprising performing a consistency check at run-time to ensure that the reference attribute only references objects of a prescribed cardinality.

10. The method of claim 1, further comprising handling changes in the type and cardinality of the reference attribute, in order to synchronize the classes and objects.

11. A system for modeling an object-oriented system, comprising:

(a) a computer;

(b) means, performed by the computer, for creating a reference-based association relating first and second classes by specifying a reference attribute in the first class corresponding to the second class, wherein the reference attribute in the first class includes a type and cardinality;

(c) means, performed by the computer, for instantiating one or more objects from the first class and one or more objects from the second class; and (d) means, performed by the computer, for associating one or more of the objects of the first class to one or more objects of the second class using the reference attribute, wherein the type included in the reference attribute indicates that only objects instantiated from the second class can be connected to the objects instantiated from the first class and the cardinality included in the reference attribute indicates how many objects from the second class can be connected to the objects of the first class, thereby maintaining consistency between the classes and the objects in order to provide an exact execution behavior for the objects instantiated from the classes.

12. The system of claim 11, further comprising means for generating source code for the objects that is consistent with the reference-based association.

13. The system of claim 11, further comprising means for specifying a name for the reference attribute.

14. The system of claim 11, wherein the type of the reference attribute corresponds to the second class.

15. The system of claim 11, wherein the cardinality of the reference attribute limits how many objects from the second class can be connected to the objects of the first class.

16. The system of claim 11, further comprising means for executing a run-time system that maintains consistency between the objects and the classes.

17. The system of claim 11, further comprising means for synchronizing object reference-based associations with their corresponding class reference-based associations.

18. The system of claim 11, further comprising means for performing a consistency check at run-time to ensure that the reference attribute only references objects of a prescribed type.

19. The system of claim 11, further comprising means for performing a consistency check at run-time to ensure that the reference attribute only references objects of a prescribed cardinality.

20. The system of claim 11, further comprising means for handling changes in the type and cardinality of the reference attribute, in order to synchronize the classes and objects.

21. An article of manufacture comprising a computer program carrier tangibly embodying one or more computer programs that, when executed, cause the computer to perform a method for modeling an object-oriented system, the method comprising:

(a) creating a reference-based association relating first and second classes by specifying a reference attribute in the first class corresponding to the second class, wherein the reference attribute in the first class includes a type and cardinality;

(b) instantiating one or more objects from the first class and one or more objects from the second class; and (c) associating one or more of the objects of the first class to one or more objects of the second class using the reference attribute, wherein the type included in the reference attribute indicates that only objects instantiated from the second class can be connected to the objects instantiated from the first class and the cardinality included in the reference attribute indicates how many objects from the second class can be connected to the objects of the first class, thereby maintaining consistency between the classes and the objects in order to provide an exact execution behavior for the objects instantiated from the classes.

22. The method of claim 21, further comprising generating source code for the objects that is consistent with the reference-based association.

23. The method of claim 21, further comprising specifying a name for the reference attribute.

24. The method of claim 21, wherein the type of the reference attribute corresponds to the second class.

25. The method of claim 21, wherein the cardinality of the reference attribute limits how many objects from the second class can be connected to the objects of the first class.

26. The method of claim 21, further comprising executing a run-time system that maintains consistency between the objects and the classes.

27. The method of claim 21, further comprising synchronizing object reference-based associations with their corresponding class reference-based associations.

28. The method of claim 21, further comprising performing a consistency check at run-time to ensure that the reference attribute only references objects of a prescribed type.

29. The method of claim 21, further comprising performing a consistency check at run-time to ensure that the reference attribute only references objects of a prescribed cardinality.

30. The method of claim 21, further comprising handling changes in the type and cardinality of the reference attribute, in order to synchronize the classes and objects.

* * * * *